United States Patent [19]

Shaffer et al.

[11] Patent Number: 4,777,596

[45] Date of Patent: Oct. 11, 1988

[54] TEXT REPLACEMENT TYPING AID FOR COMPUTERIZED TEXT EDITOR

[75] Inventors: Gedaliah R. Shaffer; Joseph Shurpin, both of Brooklyn; Lawrence M. Parks, New York, all of N.Y.

[73] Assignee: Computer Science Capital L.P., New York, N.Y.

[21] Appl. No.: 881,107

[22] Filed: Jul. 2, 1986

[51] Int. Cl.⁴ ............................................... G06F 1/00
[52] U.S. Cl. ................................................... 364/300
[58] Field of Search ... 364/200 MS File, 900 MS File, 364/300; 400/98

[56] References Cited

U.S. PATENT DOCUMENTS

| | | | |
|---|---|---|---|
| 4,396,992 | 8/1983 | Hayashi et al. | 364/900 |
| 4,459,049 | 7/1984 | Howell et al. | 364/900 X |
| 4,464,070 | 8/1984 | Hanft et al. | 400/98 |
| 4,650,349 | 3/1987 | Westreich | 364/900 X |

Primary Examiner—Raulfe B. Zache
Attorney, Agent, or Firm—Gottlieb, Rackman & Reisman

[57] ABSTRACT

A word processing system employing text substitution wherein the typist defines short forms, which when typed as normal text initiate text substitution of the short form by a long form.

6 Claims, 5 Drawing Sheets

TEXT REPLACEMENT TYPING AID FOR COMPUTERIZED TEXT EDITOR

BACKGROUND OF THE INVENTION

This invention relates to apparatus and methods for the recording of alphameric information. More specifically, it relates to digital computing systems employing text input capabilities.

Text input capabilities for digital computers such as word processing systems are well known. They most commonly comprise a micro-processor based computer running under an operating system having handlers for a variety of peripheral input and output devices. The available word processing systems often belong to a family, each adapted to function on specific hardware on which the system operates. Each of the programs may have unique manners of accessing the associated input/output peripheral units, although many manage their input/output functions through commercially available operating system function calls.

The typical text editor associated with a word processing system, in addition to inputting character strings as they are typed by pressing a sequence of keys on a keyboard, also has the facility of passing certain routines to execution by the overall system when called for by multiple keystrokes, typically a so-called "function key" and additional following keystrokes. In addition there may be specific so-called function keys which are dedicated to call for the performance of certain tasks within the overall word processing system.

One of the useful features of some text input systems is the incorporation of stored text into the typing stream by typing only a few keys. For example, a system comprising an IBM PC computer together with a software package known as KeyWorks has the ability to utilize in combination two keys, one of which may be a dedicated function key, to call into the program subroutines for inserting fairly large text segments.

It is an object of the present invention to provide an improved keyboard input system wherein the user can create a library of short expressions, typically one or a few keystrokes, which, when typed in the normal manner and followed by a space or other delimiters, cause the substitution of a predetermined passage of text into the stream of text.

It is a further object of the present invention to utilize a modified keyboard handler subset of the overall system to implement the aforesaid invention so that a single keyboard input system will function with any word processing system making conventional calls upon the keyboard handler.

DESCRIPTION OF THE PREFERRED EMBODIMENT

The preferred embodiment of the present invention comprises a microprocessor based digital computer having a hard disk or diskette based, file oriented word processing system that receives input from a keyboard imput device through normal operating system input function calls to a keyboard handler routine. The word processing system is also adapted to output text strings to a display device, typically a cathode ray tube or liquid crystal based device, which is also capable, in response to keyboard input to delete text characters from the display. The preferred embodiment of the present invention provides a keyboard input/output subroutine of a keyboard handler routine having an enlarged text buffer region so that a particular text passage of reasonable size (long form) can be temporarily stored therein. During operation of the program the typist types a short form comprising one to five characters followed by a space, which is output to a display device such as a CRT device. A count is kept of all non-space characters. When a space is typed the last word typed is compared to a library of stored short forms.

If a short form match is found in the library of short forms, a number of deletions equal to the short form's character count is placed in the keyboard buffer followed by the full text corresponding to the library entry which is indexed by the particular short form. This string of information in the keyboard buffer is then passed character by character to the word processing package under word processor control resulting in deletion of the short form and the insertion of the text string represented by the short form as if keyed in by the operator. Since the keyboard handler is used, the system operator in conjunction with any program which makes standard operating system calls upon the keyboard handler.

In this manner a typist can type in a completely normal manner without having to break his or her typing pattern to resort to specific function keys and directly insert into the program any particular grouping of stored characters.

DETAILED DESCRIPTION OF A PREFERRED EMBODIMENT

Figure 1:
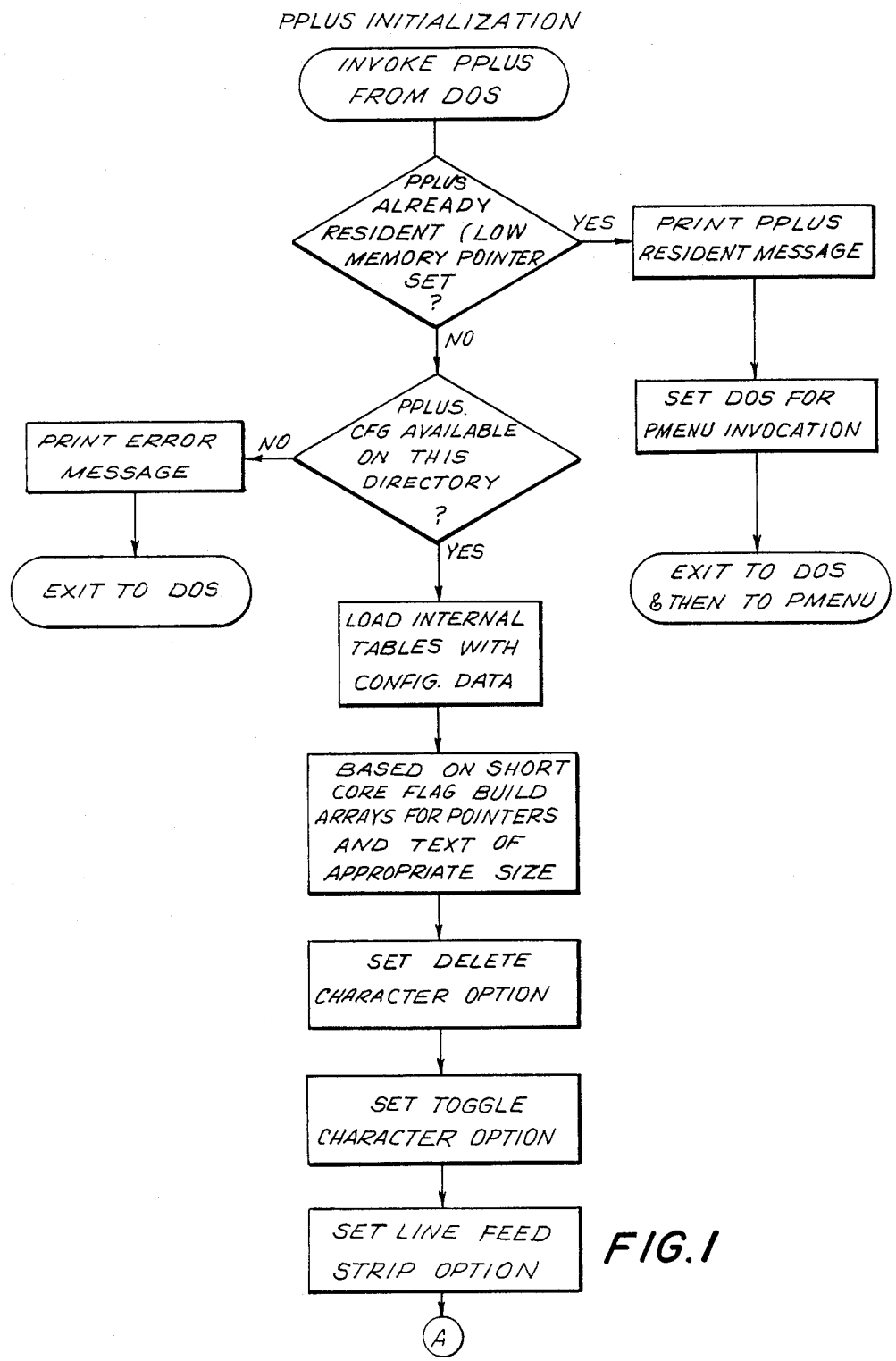
FIG. 1 is a logic diagram of the Initialization sequence of the present invention.

A logic diagram of the preferred embodiment is depicted in FIG. 1. The system may be used with an 8088, 8086, 80286, or 80288 microprocessor based personal computer such as the IBM PC.

FIG. 1 shows the initialization logic where the invention is invoked from a disk operating system (DOS). A check is first made to determine whether the system is already resident in memory through previous use. This can be determined by examining the value of the low memory pointer which identifies the amount of memory made resident by DOS. If the system is already resident, a message so indicating is sent to the screen and DOS is set to invoke the system menu feature, and the system exits from the initialization stage.

If the system is not already resident, a further check is made to determine whether the system's configuration data is available on a DOS default directory. If it is not, an error message is printed and the system exits to DOS.

Internal tables are loaded with configuration data to establish memory allocation for short forms and long forms and an array of pointers to the text of appropriate size is constructed.

The operator is then offered the option of selecting the key combinations to be used for deleting characters, for toggling the system on and off, and for line feeding. The keyboard buffer is then moved and expanded.

Selection is made of a library of word lists comprising short and long forms if more than one library is present.

Upon finding the word list, short and long forms are read from the list and pointers to the words are loaded into tables. Once the list is exhausted, the table of pointers is sorted to shorten the access time to a particular entry.

For a system employing calls to DOS functions via interrupts, two low memory interrupt (e.g., 9 and 16) values are saved and replaced with pointers to the resident keyboard driver and keyboard interrupt routines of FIGS. 3–6. The resident size of the system is then retrieved and the system exits via the operating system which can then automatically invoke the system.

Figure 2:
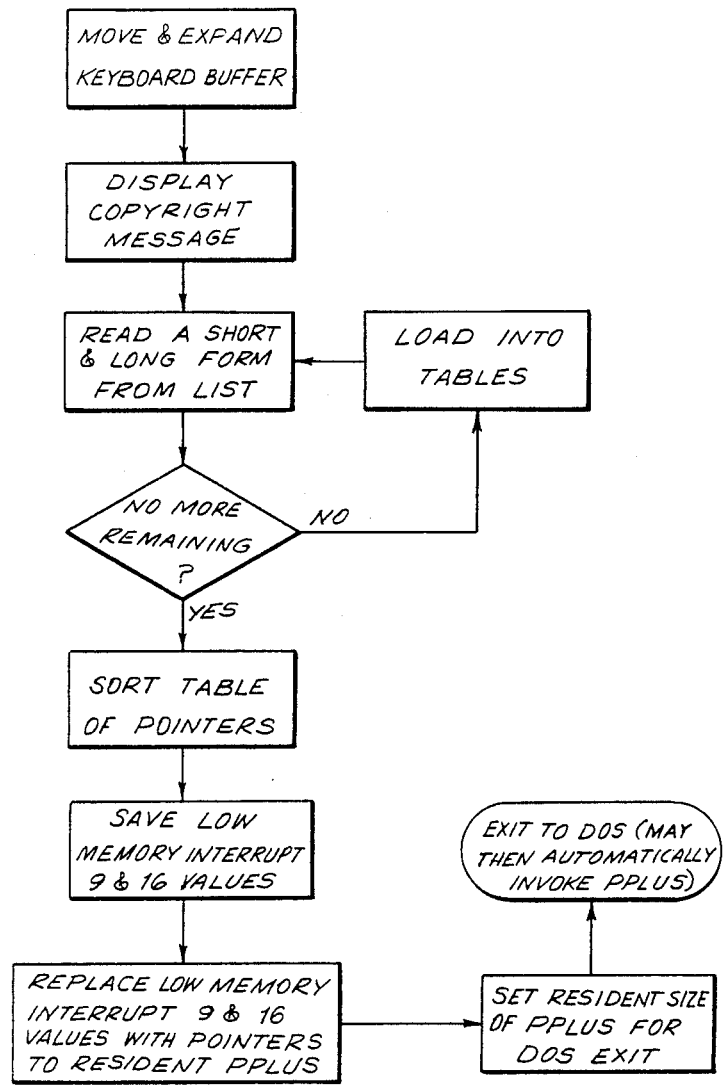
FIG. 2 is a continuation of the logic diagram of FIG. 1.
Figure 3:
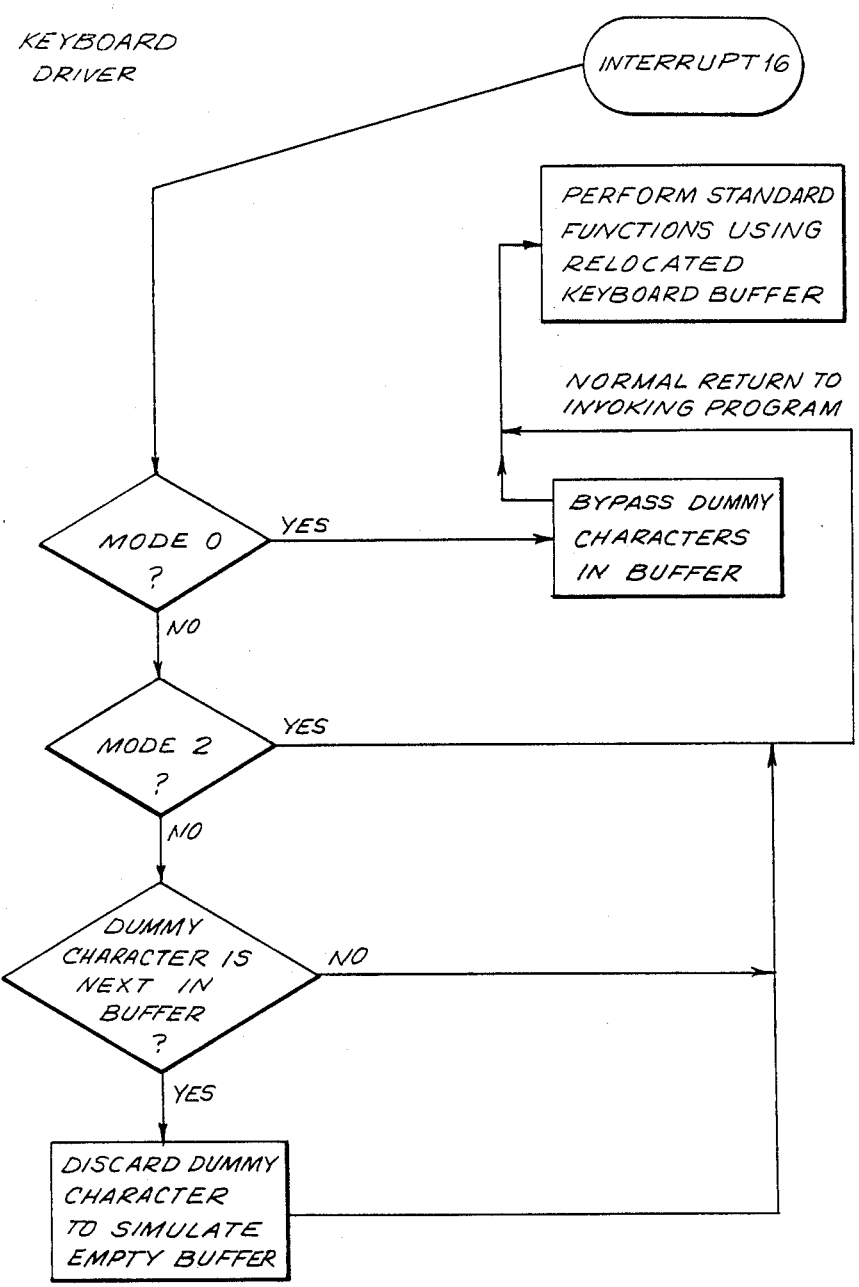
FIG. 3 is a logic diagram of the Keyboard Input/Output Driver interrupt routine of the present invention.
Figure 4:
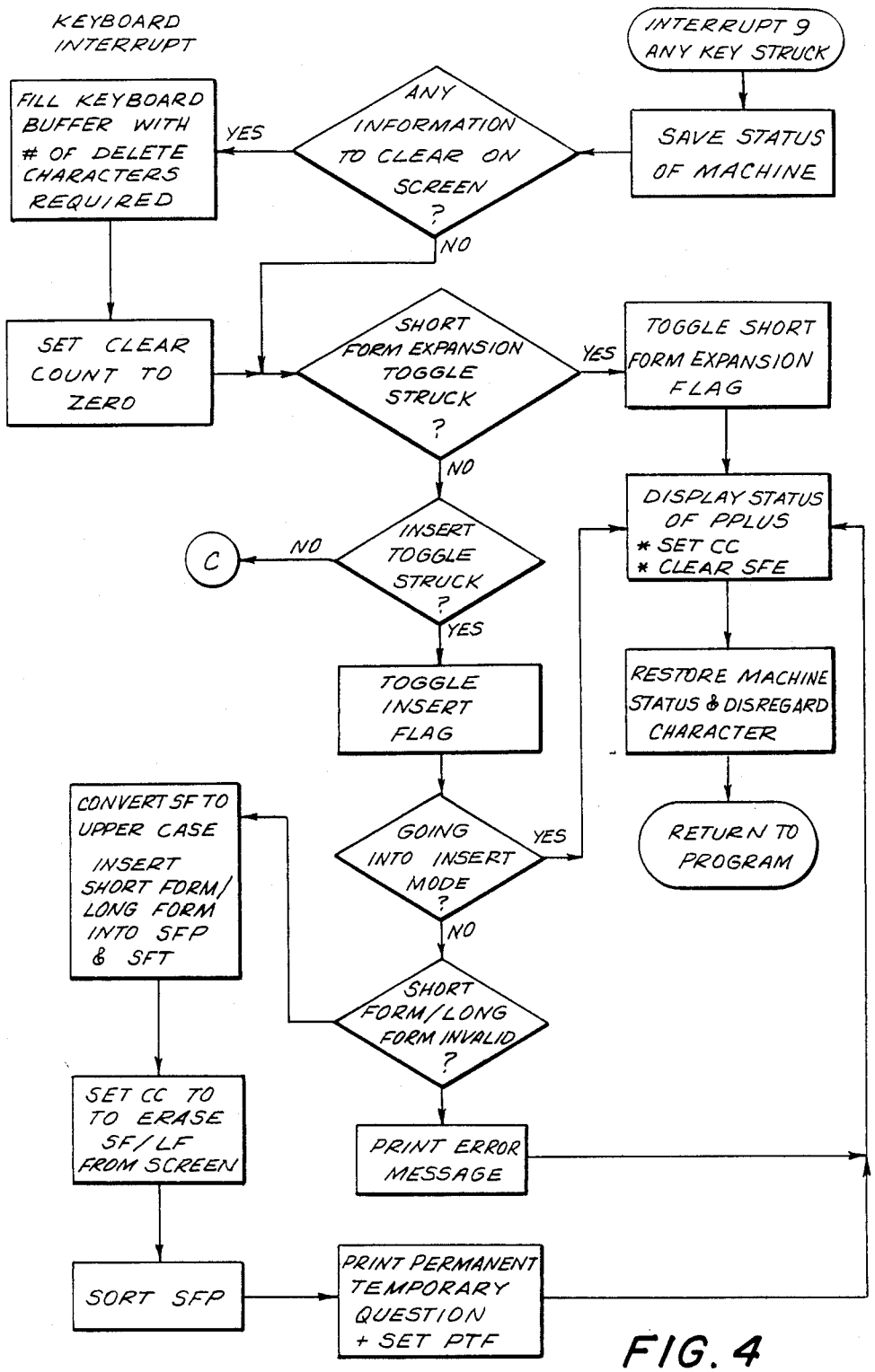
FIG. 4 is a logic diagram of a portion of the keyboard hardware interrupt routine of the present invention.
Figure 5:
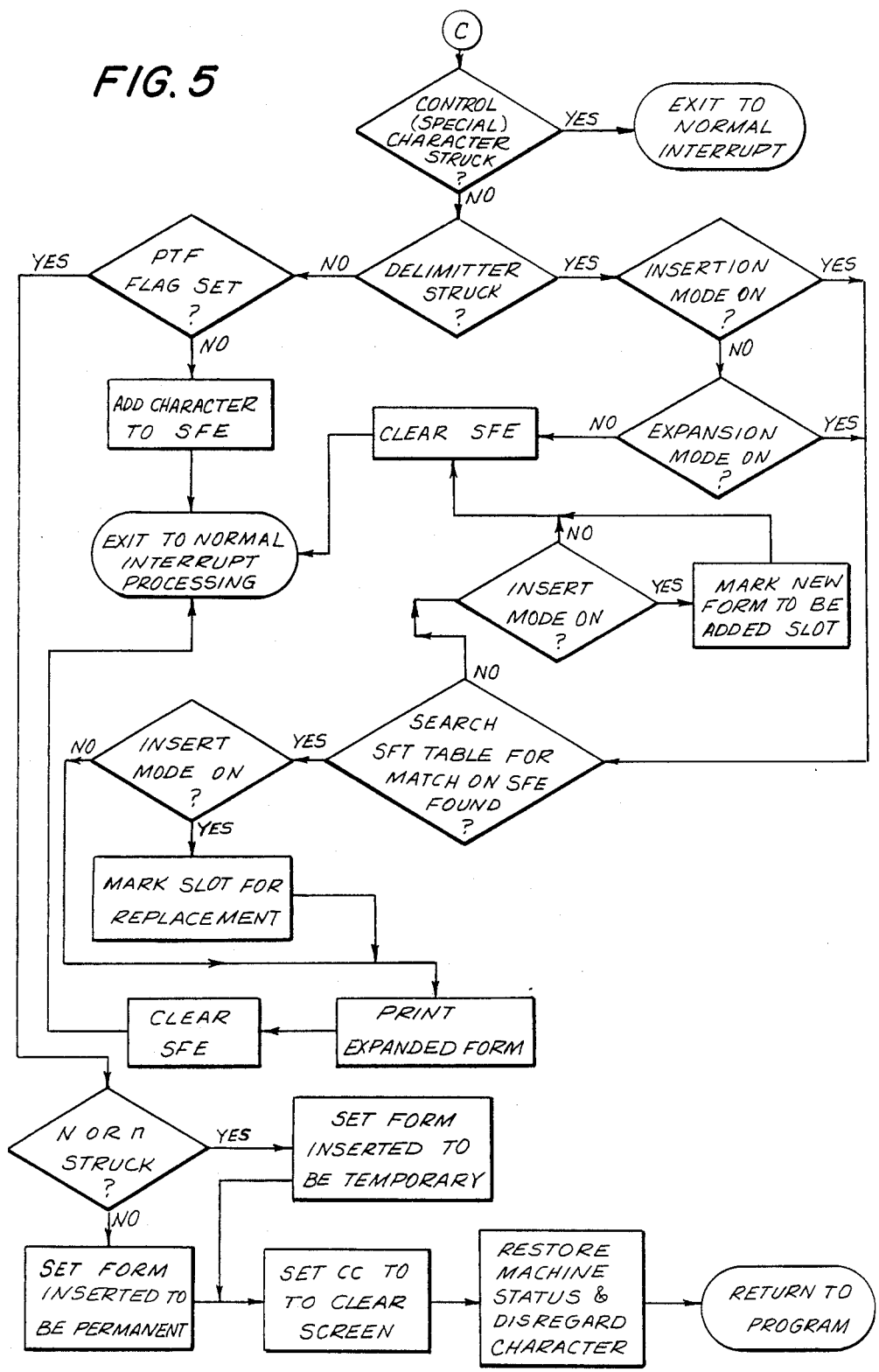
FIG. 5 is a logic diagram of a continuation of the logic diagram of FIG. 4.

FIG. 2 is a logic diagram for the keyboard driver. It is invoked for example through interrupt 16. A check is made for text entry modes of word processors that introduce dummy characters into the text stream or which empty the keyboard buffer when recording special characters, e.g., carriage returns. If those modes are sensed, the dummy characters are bypassed or the deletion of the buffer is faked so as to avoid emptying the keyboard buffer. This is important to preserve the integrity of the long forms.

Another interrupt, e.g. interrupt 9, is used to invoke the keyboard. This interrupt saves the status of the machine and checks whether there is any information to clear on the screen, for example, after a short form followed by a space has been typed and has been recognized as a short form. If so, the keyboard buffer is filled with the number (obtained from a counter) of delete characters necessary to delete the short form from the screen and the count of the number of characters to clear is reset to zero.

If the key struck was not a text character but was the short form expansion toggle, then a short form expansion flag is toggled and the status of the toggle is displayed. If the flag is set, a count will be made of the number of characters of the short form that must be erased from the screen upon receipt of the next keyboard interrupt. If the flag is clear the characters forming a potential short form are saved. The machine status is then restored and the toggle character disregarded. This ends the interrupt.

If the short form expansion toggle has not been struck, then a check is made to see whether the insert toggle has been struck which allows access to insertion of new short and long forms into the libraries. If it has, the insert flag is toggled and a check is made as to whether or not the insert mode is being entered. If it is, then the status of the system is set, the machine status is restored and the character disregarded followed by a return to the program. If not going into the insert mode, a check is made as to whether the short form or the long form is invalid so that an error message may be displayed and a return made to display the status of the system. If the short or long form is valid, the short form is converted to upper case and its text inserted into the table of text and its location inserted into the table of pointers. The internal count of characters that must be erased is set and the table of pointers to the text is sorted. An option is offered the user at this point to make the entry of the short and long forms part of the library file and then there is a return to the program.

If the insert toggle has not been struck, a check is made whether a control character has been struck. If it has there is an exit to the standard operating system interrupt. If not, a check is made as to whether a delimiter was struck.

If the delimiter was struck, a check is made as to whether the insertion mode is on. If it is not on, a test is made as to whether the text expansion mode is on. If either of these two is on, the text of the substiuuted form table is searched for a match. If the expansion mode is not on, the characters forming a potential short form are cleared and there is an exit to normal interrupt processing.

If the delimiter was not struck, a check is made as to whether the PTF flag which determines if the system has been asked whether changes are to be made in the retained library has been set. If not, the character is added to the short form expression and there is an exit to normal system interrupt processing. If the PTF flag has been set, a check is made as to whether the form should be made part of the saved libraries. Then, the internal count is set for the number of characters that must be erased to clear the screen. The machine status is restored, the last character disregarded, and return is made to the word processing program.

What is claimed is:

1. A process for text editing on a microprocessor based computer system having word processing capability that employs a keyboard input device and an output display device capable of deleting characters comprising the steps of
    (a) recognizing short form alphameric string input from said keyboard and delimited by punctuation characters or spaces
    (b) attempting to match said short form with an entry from a library of short forms and upon success associating said short form with a long form
    (c) deleting said short form upon a successful match and substituting a long form for said short form on the display device wherein said step of attempting to match said short form is initiated by typing of a space character or other delimiter at the keyboard.

2. The process of claim 1 wherein the step of deleting said short form and substituting said long form comprises the step of outputting a series of delete characters and the long form from a keyboard buffer.

3. The process of claim 1 wherein the step of associating said short form with a long form is preceded by the step of associating each long form with a pointer and indirectly accessing said long form.

4. The process of claim 1 wherein libraries comprising said short form and said long form are loaded into the computer system.

5. The process of claim 4 wherein said libraries are selected from an array of prestored libraries.

6. The process of claim 4 wherein further short forms and long forms are added to said libraries.

* * * * *

REEXAMINATION CERTIFICATE (2927th)
United States Patent [19]
Shaffer et al.

[11] B1 4,777,596
[45] Certificate Issued Jun. 25, 1996

[54] TEXT REPLACEMENT TYPING AID FOR COMPUTERIZED TEXT EDITOR

[75] Inventors: Gedaliah R. Shaffer; Joseph Shurpin, both of Brooklyn; Lawrence M. Parks, New York, all of N.Y.

[73] Assignee: Productivity Software International Inc., New York, N.Y.

Reexamination Request:
No. 90/003,306, Jan. 14, 1994

Reexamination Certificate for:
Patent No.: 4,777,596
Issued: Oct. 11, 1988
Appl. No.: 881,107
Filed: Jul. 2, 1986

[51] Int. Cl.⁶ .................................................. G06F 17/24
[52] U.S. Cl. .................. 364/419.15; 364/225.8; 364/943.44; 364/DIG. 1
[58] Field of Search .................. 364/419.12, 419.14, 364/419.15; 400/63, 91, 92, 94; 434/158

[56] References Cited

U.S. PATENT DOCUMENTS

| | | | |
|---|---|---|---|
| 4,041,467 | 8/1977 | Cota et al. | 395/146 |
| 4,339,806 | 7/1982 | Yoshida et al. | 364/419.02 |
| 4,374,625 | 2/1983 | Hanft et al. | 400/98 |
| 4,438,505 | 3/1984 | Yanaguichi et al. | 364/419.02 |
| 4,459,049 | 7/1984 | Howell et al. | 400/95 |
| 4,486,857 | 12/1984 | Heckel | 364/DIG. 2 |
| 4,503,426 | 3/1985 | Mikulski et al. | 345/171 |
| 4,553,860 | 11/1985 | Imaizumi et al. | 400/68 |
| 4,566,065 | 1/1986 | Toth et al. | 364/419.15 |
| 4,674,066 | 6/1987 | Kucera | 364/DIG. 2 |
| 4,730,269 | 3/1988 | Kucera | 364/DIG. 2 |
| 4,760,528 | 7/1988 | Levin | 364/419.15 |
| 4,783,645 | 11/1988 | Goldwasser et al. | 400/100 X |

FOREIGN PATENT DOCUMENTS

| | | |
|---|---|---|
| 0039393 | 1/1981 | European Pat. Off. . |
| 56-33782 | 4/1981 | Japan . |

OTHER PUBLICATIONS

*Microcomputer Systems: The 8086/8088 Family*, Liu et al., 1984 Prentice Hall, pp. 229–251 and 272–275.

*The Handbook of Computers and Computing*, Seidman et al., Van Nostrand Reinhold Co., 1984, p. 228.

*Byte*, Jul. 1982, Holder, "Software Tools for Writers", pp. 138–139, 142, 144, 146, 150, 152, 154, 158, 160, 163.

EMACS on-line Manual, date unknown, 4 pages.

"EMACS The Extensible, Customizable Self-Documenting Display Editor" by Richard M. Stallman, Mar. 26, 1981, pp. 1–27.

IBM Technical Disclosure Bulletin, vol. 17, No. 8, Jan., 1975 "Word Generation System for a Typist", A. Arellano and H. Marcar.

Prokey Manual Excerpt, Sixth Edition May, 1985, pp. 1–4.

"ALPSwriter reference manual", pp. 2.72–2.73, date unknown.

"CPT Speed Syping Operator's Manual", date unknown, pp. 1–12.

MIT AI Memo 555, 30 Mar. 1983 "EMACS Manual for TWENEX Users" by Richard M. Stallman, pp. 151–154.

"Practiword Program Manual", 1984 Program by Leo Kenen, Manual by Elizabeth R. Reece, pp. 3–7, 14–15 and 100–101.

*Abbreviated Typing for Word Processing*, IBM Technical Disclosure Bulletin, vol. 21, No. 9, Feb. 1979, S. Todd.

Five Spelling–Correction Programs for CP/M–Based Systems, Phil Lemmons, Nov. 1981, pp. 434–448.

XtraKey™ User's Guide, A Keystring Utility by Xpert Software™, date unknown.

Macro Mastery, Burton L. Alperson, Jan. 1984, pp. 132–143.

Sidekick Puts Windows on WordStar's World, Stephen Manes, pp. 188–191, date unknown.

(List continued on next page.)

*Primary Examiner*—Robert A. Weinhardt

[57] ABSTRACT

A word processing system employing test substitution wherein the typist defines short forms, which when typed as normal text initiate text substitution of the short form by a long form.

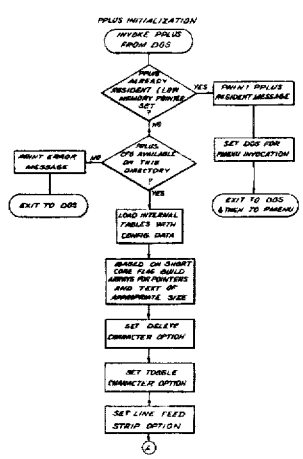

OTHER PUBLICATIONS

Unlimited Power at the Touch of a Key, SmartKey Manual Update Version 5.2, date unknown.

PC Notepad Made Easy, Steve Holzner, Dec. 25, 1984, pp. 269–282.

SmartPrint Version 5.2, A SmartKey Tool That Can:, etc., date unknown.

Let David Rose tell you about our powerful new ProKey 4.0, David Rose, date unknown.

Macro Dynamos for the PC, Dara Pearlman, May 14, 1985, pp. 193–204.

We Interrupt this Program, Ted Forgeron, Tech Notebook 35, date unknown.

Bluebook, PC Magazine, Dec. 25, 1984, pp. 329–334.

PC Statistician, PC Tutor, PC Magazine, Nov. 13, 1984, pp. 390–391.

Quick-Key, A North Star Basic Statement Generator, Leonard E. Garcia, Nov./Dec., 1980, pp. 418–422.

Designing a Text Editor? The User Comes First; Steven Jong, Apr. 1982, Byte Publications Inc., pp. 284–300.

SmartKey Manual, date unknown.

REEXAMINATION CERTIFICATE ISSUED UNDER 35 U.S.C. 307

THE PATENT IS HEREBY AMENDED AS INDICATED BELOW:

AS A RESULT OF REEXAMINATION, IT HAS BEEN DETERMINED THAT:

Claims 1-6 are cancelled.

* * * * *